March 11, 1969 E. WITTING 3,432,637
GAS SHIELDED ARC WELDING TORCH WITH AUTOMATIC ADJUSTABLE
SHIELDING GAS FEED
Filed June 23, 1964

INVENTOR.
ERNST WITTING
BY
ATTORNEY

United States Patent Office 3,432,637
Patented Mar. 11, 1969

3,432,637
GAS SHIELDED ARC WELDING TORCH WITH AUTOMATIC ADJUSTABLE SHIELDING GAS FEED
Ernst Witting, Frankfurt, Germany, assignor to Messer Griesheim G.m.b.H., Frankfurt am Main, Germany, a corporation of Germany
Filed June 23, 1964, Ser. No. 377,220
U.S. Cl. 219—74                                8 Claims
Int. Cl. B23k 9/16

ABSTRACT OF THE DISCLOSURE

A gas shielded arc welding apparatus includes a control for automatically adjusting the after-flow of gas. A supply conduit and a parallel branch extending therefrom are connected between a gas supply and a welding torch for controlling the flow of gas to the workpiece. A diaphragm operated valve is connected to the branch for opening and closing the conduit. A shutoff valve is provided in the branch downstream of the diaphragm valve whereby gas will continue to flow in the conduit upon the closing of the shut-off valve until sufficient pressure is developed in the branch to close the diaphragm valve. Various valves are included in the control for regulating the gas supply and after-flow.

---

Figure 1:
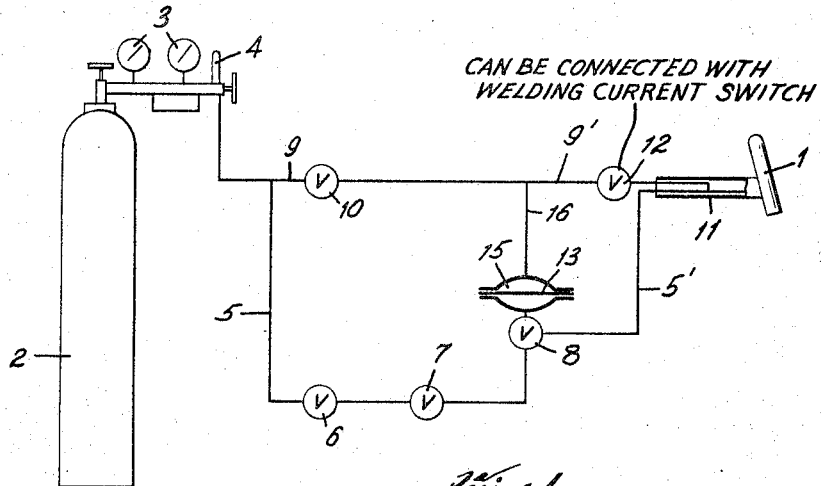

When working with inert gas shielded arc welding torches, especially when using a non-consumable electrode composed of tungsten, it is necessary to surround the highly heated electrode after completion of the welding procedure with shielding gas for a short time afterward and suitably until it has cooled off to such an extent that erosion through the effect of the surrounding air can no longer occur. Suitably this continued flow is accomplished by automatic means in such a manner that it begins automatically upon completion of the welding procedure and is completed likewise automatically after a predetermined time interval.

For carrying out the mentioned sequence of operation, devices of the most varied kinds are known. In addition to the use of timing clocks or similar time delay devices special after-flow containers have already been provided which fill up with shielding gas to a certain pressure during welding and after completion of the welding operation allow their content to flow through a metering nozzle to the torch.

The usual arrangements of this kind are generally unsatisfactory. The provision of a timing clock is relatively expensive and subject to disturbances, while with the provision of after-flow containers the duration of after-flow cannot be conformed in a desired manner with the prevailing requirements so that the after-flow time is frequently in some cases too long and in others too short.

According to the invention a gas shielded arc welding torch includes an arrangement for automatically adjusting the temporary after-flow of the shielding gas upon completion of the welding operation which arrangement has a shielding gas supply conduit for supplying a source of such gas to a torch a pressure reducing valve in said conduit near said source; an adjusting valve in said conduit downstream of said reducing valve; a fixedly set throttle in said conduit downstream of said adjusting valve; a control conduit branching off from said supply conduit downstream of said reducing valve and running parallel to the remaining portion of said supply conduit downstream of the branching; a diaphragm operated valve connected to close the supply conduit downstream of said adjusting valve and said fixedly set throttle, in response to gas pressure in the control conduit; a fixedly set throttle in the control conduit upstream of the pressure-response connection of the diaphragm valve; and a shut-off valve the control conduit downstream of said pressure response connection.

The throttle valve disposed in the shielding gas control conduit, when fixedly set, is so adjusted that the time interval within which at the pressure maintained substantially constant by the reducing valve sufficient gas flows into the pressure space above the diaphragm of the shut-off valve to bring this to the closed position, corresponds with the time interval required for the after flow. Alternatively, the fixedly set throttle valve in the main line of the shielding gas is so adjusted that at the gas pressure maintained constant by the reducing valve and with the adjusting valve and the diaphragm actuated shut-off valve in the open position a fully sufficient amount of gas flows toward the torch to cover the maximum shielding gas requirement of the torch.

Through the arrangement according to the invention, a gas shield and an arc welding torch is provided which is distinguished by a simple construction and operation that is insensitive to disturbances. In this connection, it is a special advantage that only a single shut-off device is disposed in the torch handle so that the torch can readily be kept light in weight and small in dimension. The remaining arrangements, on the other hand, are located immediately adjacent to the gas cylinder or in a special control apparatus without burdening the operator either in respect to space or weight.

Figure 2:
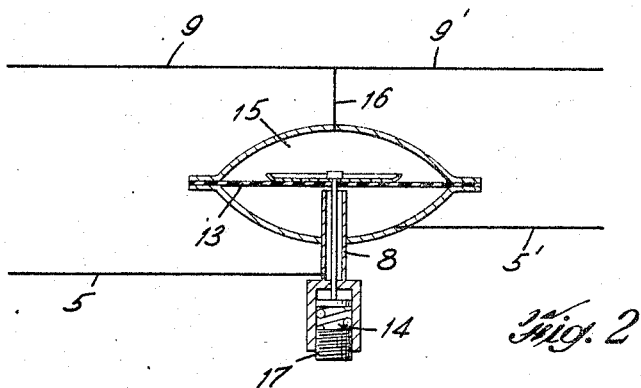

The drawing shows the apparatus of the invention in an exemplary form namely: FIGURE 1 is a schematic representation of a gas shielded arc welding apparatus in its entirety and FIGURE 2 illustrates the diaphragm operated shut-off valve by itself in an enlarged scale.

The shielding gas which is to be supplied to the torch 1 which is provided with a non-consumable electrode, is derived from the storage cylinder 2. To the cylinder 2 there is attached the usual reducing valve 3 which maintains the gas pressure constant at a certain magnitude, for example four atmospheres gage, as well as a gas consumption meter 4. Downstream of the connector carrying these parts, the gas conduit divides into two parallel branches, namely a main conduit 5 with the control valve 6 and the fixedly set throttle valve 7 which is connected to a diaphragm actuated valve 8; and a control conduit 9 in which there is likewise disposed a throttle valve 10 which is generally fixedly set. The two conduits 5 and 9 lead, preferably in the form of two flexible hoses 5' and 9', to the torch handle 11 in which—downstream of a manually operable shut-off device 12 disposed in the control conduit 9'—they again unite. The gas then flows in known manner to the torch 1.

The diaphragm operated shut-off valve 8 which is disposed in the main gas conduit 5 is maintained shut (FIG. 2) against the force of a spring 14 acting in the open direction, by the gas pressure prevailing in the control conduit 9 acting on a pressure responsive diaphragm 13; alternatively another suitable device for this purpose, for example, may be a pressure cylinder with a movable plunger. For this purpose, the pressure space 15 above the diaphragm 13 is connected by a conduit 16 with the control conduit 9. The bearing force of the spring 14 acting in the opening direction can be increased or decreased in known manner by means of adjusting screw 17.

The operation of the apparatus is as follows: During the welding procedure the manually operated shut-off device 12 in the torch handle 1 is open. The gas pressure above the diaphragm 13 is very low, corresponding to the low pressure occurring during discharge of the gas from the torch. As a result, also the diaphragm actuated shut-off valve 8 is maintained open under the influence both of the gas pressure exerted from below and of the spring 14, when utilized. The shielding gas flows—predominantly through the main conduits 5–5', and in a smaller proportion through the control conduits 9–9'—to the torch 1, whereby the gas flow is adjusted by means of the control valve 6.

Upon completing the welding operation, the operator closes the shut-off device 12 in the control conduits 9–9' whereby shielding gas flows toward the torch only through the main conduits 5–5'. In other respects the gas, which flows under the influence of the throttle valve 10 only relatively slowly through the forward portion of the control conduit 9 and the connecting conduit 16 into the space 15 above the diaphragm 13 of the shut-off valve 8, acts in opposition to the force of the spring 14 on the diaphragm 13, gradually forcing the valve 8 closed and thereby, after a period of time also shuts off the further flow of gas over the main conduits 5–5' to the torch 1. Through a suitable selection of the loading of the spring 14 as well as through suitable adjustment of the throttle valve 10, the time period between the closing of the valve 12 and the closing of the valve 8, namely the so-called after-flow time, can be controlled in any desired manner. In this connection, however, the spring 14 must be so adjusted that, upon reaching the full pressure maintained constant by the reducing valve 3, the diaphragm actuated shut-off valve 8 is always closed.

The valve opening of the throttle valve 7 in the main conduit 5 is so selected that after opening valves 6 and 8—similarly with due regard for the pressure maintained constant by the reducing valve 3—an amount of gas flows to the torch 1 which is somewhat greater than the maximum flow of gas necessary for carrying out the welding operation.

Upon resuming the welding operation, the shut-off valve 12 in the torch handle 11 is fully opened by the operator. Thereby at first the contents of the pressure space 15 above the diaphragm 13 of the valve 8 flow through the control conduit 9 to the torch. The diaphragm 13 is released and the spring 14, supported by the gas pressure prevailing below the diaphragm, opens the valve 8 whereupon the normal gas flow sets in.

The invention may be carried out in the most varied forms and is not limited to the described exemplary embodiments. Thus, for example, the adjustability of the spring 14 in the diaphragm actuated shut-off valve 8 may be omitted if in place of the fixedly set throttle valve 10 in the control conduit 9 an adjustable throttle valve is provided with the aid of which the gas flow through the control conduit 9 and thereby also the after-flow duration can be changed within wide limits. Furthermore, by suitable selection of the gas pressure as well as by a corresponding selection of the diameter of the valve seat and diaphragm, it is possible to omit the spring 14 entirely. For certain purposes of operation, it may suffice, if furthermore the adjustibility of the valve 10 in the control conduit 9 is dispensed with so that a substantially constant after-flow time is effected solely through the use of a fixedly set throttle valve in the control conduit and a diaphragm which is not subject to spring loading.

Finally, depending upon the requirements of the particular case, the actuating member of the shut-off device for the control conduit may be coupled with the actuating member of an electric switching means which, for example, serves for switching the welding current or the high frequency current on and off, or for deactivating any other auxiliary control device in the welding arrangement.

What is claimed is:

1. In a gas-shielded arc welding torch, an arrangement for automatically adjusting the temporary after-flow of the shielding gas upon completion of the welding operation, said arrangement comprising a shielding gas supply conduit to the torch and a control conduit branching off from said supply conduit and running to the torch in parallel with said supply conduit; a diaphragm-operated valve in said supply conduit and connected to the control conduit for opening and closing the supply conduit in response to the pressures in said control conduit; a throttle in said control conduit upstream of the connection to said diaphragm valve, a shut-off valve in the control conduit downstream of said connection to the diaphragm valve; and a control valve and throttle valve in the supply conduit downstream of the branching off of the control conduit but upstream of the diaphragm valve.

2. The combination of claim 1 characterized in that the shielding gas conduit and control conduit are reunited in the torch handle and that the shut-off valve is manually operable and likewise disposed in the handle.

3. The combination of claim 1 characterized in that the diaphragm valve and control conduit throttle are connected to provide a variable closure time for that valve.

4. The combination of claim 2 characterized in that the diaphragm valve includes a readily adjustable spring acting on the diaphragm.

5. The combination of claim 1 in which the throttle valve in the shielding gas supply conduit limits the gas flow to the torch to cover the maximum shielding gas requirement of the torch.

6. The combination of claim 1 characterized in that the shut-off valve is connected for actuation with electric switch means for terminating the flow of welding current to the torch.

7. The combination of claim 2 characterized in that the throttle in the shielding gas control conduit is adjustable.

8. The combination of claim 1 characterized in that the diaphragm valve includes a spring acting on the diaphragm in the opening direction.

References Cited

UNITED STATES PATENTS

| | | | |
|---|---|---|---|
| 2,417,994 | 3/1947 | Sheets | 251—45 X |
| 3,132,235 | 5/1964 | Anderson | 219—75 |
| 3,183,336 | 5/1965 | Sopicki et al. | 219—75 |

RICHARD M. WOOD, *Primary Examiner.*

J. G. SMITH, *Assistant Examiner.*

U.S. Cl. X.R.

251—45